United States Patent
Kasuga et al.

(10) Patent No.: US 7,670,978 B2
(45) Date of Patent: *Mar. 2, 2010

(54) OPTICAL GLASS, PRECISION PRESS MOLDING PREFORM AND OPTICAL ELEMENT

(75) Inventors: Yoshiko Kasuga, Tokyo (JP); Mikio Ikenishi, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 222 days.

This patent is subject to a terminal disclaimer.

(21) Appl. No.: 11/494,506

(22) Filed: Jul. 28, 2006

(65) Prior Publication Data

US 2007/0032366 A1 Feb. 8, 2007

(30) Foreign Application Priority Data

Jul. 29, 2005 (JP) .............................. 2005-221423

(51) Int. Cl.
*C03C 3/066* (2006.01)
*C03C 3/068* (2006.01)

(52) U.S. Cl. ......................................... 501/78; 501/79
(58) Field of Classification Search .................. 501/78, 501/79
See application file for complete search history.

(56) References Cited

U.S. PATENT DOCUMENTS 6,713,419 B1 * 3/2004 Onozawa et al. .............. 501/78
6,977,232 B2 * 12/2005 Hayashi et al. ................ 501/79
7,087,543 B2 * 8/2006 Kasuga et al. ................. 501/79
7,351,675 B2 * 4/2008 Kasuga et al. ................. 501/78
2003/0100433 A1 * 5/2003 Hayashi et al. ................ 501/79
2003/0211929 A1 * 11/2003 Hayashi et al. ................ 501/78
2004/0127343 A1 * 7/2004 Kasuga et al. ................. 501/78
2005/0164864 A1 * 7/2005 Kasuga et al. ................. 501/78
2006/0079390 A1 * 4/2006 Kasuga et al. ................. 501/78
2006/0105900 A1 * 5/2006 Kasuga et al. ................. 501/78
2006/0234850 A1 * 10/2006 Hayashi et al. ................ 501/78

FOREIGN PATENT DOCUMENTS

| CN | 1480420 A |   | 3/2004 |
| JP | 04092834 | * | 3/1992 |
| JP | 2000119036 | * | 4/2000 |
| JP | 2003176151 | * | 6/2003 |

* cited by examiner

*Primary Examiner*—Karl E Group
(74) *Attorney, Agent, or Firm*—Sughrue Mion, PLLC

(57) ABSTRACT

The optical glass has a refractive index of equal to or greater than 1.65 and an Abbé number ranging from 50 to 60. In the optical glass, as molar basis, a ratio of $SiO_2$ content to $B_2O_3$ content is greater than 0.5 and equal to or less than 0.90; a total content of $SiO_2$ and $B_2O_3$ ranges from 50 to 70 percent; $Li_2O$ content ranges from 5 to 20 percent; $La_2O_3$ content ranges from 0.5 to 22 percent; a ratio of ZnO content to RO (MgO, CaO, SrO and BaO) is equal to or greater than 0.5; a total content of $Gd_2O_3$, $Y_2O_3$ and $Yb_2O_3$ ranges from 1 to 15 percent; $Sb_2O_3$ content ranges from 0 to 1 percent; and no BaO is comprised, or a ratio of the total content of $La_2O_3$, $Gd_2O_3$, $Y_2O_3$ and $Yb_2O_3$ to the content of BaO is equal to or greater than 10.

9 Claims, 1 Drawing Sheet

OPTICAL GLASS, PRECISION PRESS MOLDING PREFORM AND OPTICAL ELEMENT

CROSS-REFERENCE TO RELATED APPLICATIONS

This application claims benefit of priority under 35 USC 119 to Japanese Patent Application No. 2005-221423 filed on Jul. 29, 2005.

BACKGROUND OF THE INVENTION

1. Field of the Invention

The present invention relates to optical glass, a precision press molding preform and manufacturing method of the same, an optical element and manufacturing method of the same. More particularly, the present invention relates to optical glass having prescribed optical constants and good precision press molding properties, a precision press molding preform and an element both comprised of the above optical glass, and methods for manufacturing the same.

2. Discussion of the Background

The advent of digital cameras and portable telephones equipped with cameras has led to rapid increases in the integration and functions of devices employing optical systems. Under such circumstances, the need for ever greater precision, weight reduction, and size reduction has been increasing in optical systems.

In recent years, to satisfy these requirements, optical designs employing aspherical lenses have been entering the mainstream. Thus, to stably and inexpensively supply large quantities of aspherical lenses comprised of high-functionality glass, precision press molding techniques (also called mold-forming techniques) by which optically functional surfaces are directly formed by press molding without a grinding or polishing step have attracted attention. The demands placed on optical glass having low-temperature softening properties suited to precision press molding are increasing each year. Such optical glasses include high refractive index, low dispersion glasses having a refractive index (nd) of equal to or greater than 1.65 and an Abbé number (vd) of 50 to 60. An example of a high refractive index, low dispersion glass having low-temperature softening properties is described in Japanese Patent No. 2,616,958 (Reference 1).

The following is conceivable in manufacturing optical elements such as lenses by precision press molding the above-described optical glasses. The glass described in Reference 1 has either an excessively high or excessively low content of $SiO_2$, which greatly affects the viscosity of the glass. When the content of $SiO_2$ is excessively low, viscosity varies sharply with temperature, the temperature range suited to precision press molding becomes extremely narrow, and glass molded in a pressing mold ends up cracking, compromising the yield during manufacturing. When the content of $SiO_2$ is excessively high, the glass transition temperature (Tg) rises, which is disadvantageous in precision press molding. Accordingly, a large quantity of alkali metal oxide is incorporated into the glass described in Reference 1 to lower the glass transition temperature (Tg). However, when a large quantity of alkali metal oxide is introduced, the stability of the glass greatly deteriorates. It is extremely difficult to achieve both a low-temperature softening property and stability while preventing cracking during press molding in high refractive index, low dispersion glass in this manner.

In light of these problems, it is an object of the present invention to provide optical glass that can be used to manufacture optical elements by precision press molding with high productivity, a precision press molding preform comprised of this glass, a method for manufacturing the same, and a method for manufacturing an optical element in which an optical element is produced with high productivity using this preform.

SUMMARY OF THE INVENTION

The present invention relates to optical glass having a refractive index (nd) of equal to or greater than 1.65 and an Abbé number (vd) ranging from 50 to 60, wherein, as molar basis, a ratio of $SiO_2$ content to $B_2O_3$ content ($SiO_2/B_2O_3$) is greater than 0.5 and equal to or less than 0.90;

a total content of $SiO_2$ and $B_2O_3$ ranges from 50 to 70 percent;

$Li_2O$ content ranges from 5 to 20 percent;

$La_2O_3$ content ranges from 0.5 to 22 percent;

a ratio of ZnO content to RO that is the total content of MgO, CaO, SrO and BaO (ZnO/RO) is equal to or greater than 0.5;

a total content of $Gd_2O_3$, $Y_2O_3$ and $Yb_2O_3$ ranges from 1 to 15 percent;

$Sb_2O_3$ content ranges from 0 to 1 percent; and no BaO is comprised, or a ratio of the total content of $La_2O_3$, $Gd_2O_3$, $Y_2O_3$ and $Yb_2O_3$ to the content of BaO (($La_2O_3+Gd_2O_3+Y_2O_3+Yb_2O_3$)/BaO) is equal to or greater than 10.

The present invention further relates to a precision press molding preform, which is comprised of the optical glass of the present invention, and an optical element comprised of the optical glass of the present invention.

The present invention further relates to a method for manufacturing a precision press molding preform, comprising separating a glass melt gob from glass melt flowing out from a pipe and, during cooling of said glass melt gob, forming said glass melt gob into a precision press molding preform comprised of the optical glass of the present invention.

The present invention still further relates to a method for manufacturing an optical glass, comprising heating the precision press molding preform of the present invention or a precision press molding preform manufactured by the method for manufacturing a precision press molding preform of the present invention and precision press molding said heated preform with a pressing mold.

The present invention makes it possible to prevent reduced productivity due to cracking of molded optical elements in a pressing mold in precision press molding, and permits the manufacturing of glass elements comprised of high refractive index, low dispersion glass with high productivity.

Further, the present invention can increase the stability of the glass at elevated temperatures and can increase the viscosity of the glass melt during outflow. Thus, it is possible to manufacture high-quality preforms with high productivity by using a method in which a glass melt gob separated from glass melt flowing out is formed into a preform during cooling of the glass melt gob.

Based on the present invention, it is possible to lower the precision press molding temperature, thereby extending the service life of the pressing mold (the service life of the mold separation films when such are provided on the molding surfaces of the pressing mold), achieving high productivity, and reducing the cost of producing optical elements, by providing optical glass having a low-temperature softening property.

Based on the present invention, it is also possible to enhance the weatherability of the glass, thereby maintaining good surface properties in preforms and optical elements.

DESCRIPTIONS OF THE EMBODIMENTS

Figure 1:
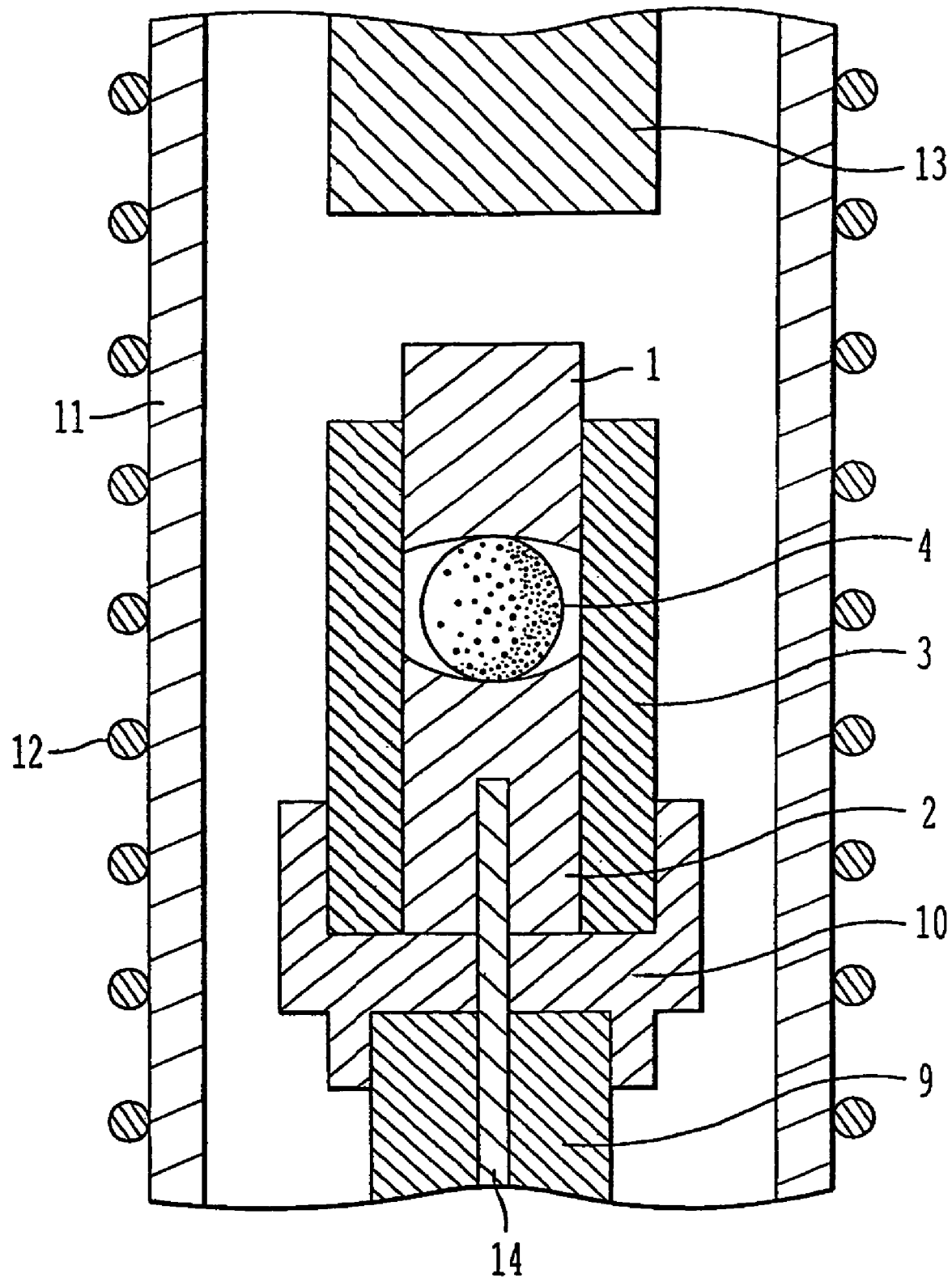
FIG. 1 is a cross-sectional explanatory drawing of a precision press apparatus.

The present invention will be described in greater detail below.

[Optical Glass]

The optical glass of the present invention has a refractive index (nd) of equal to or greater than 1.65 and an Abbé number (vd) ranging from 50 to 60.

In the optical glass of the present invention, as molar basis, a ratio of $SiO_2$ content to $B_2O_3$ content ($SiO_2/B_2O_3$) is greater than 0.5 and equal to or less than 0.90;

a total content of $SiO_2$ and $B_2O_3$ ranges from 50 to 70 percent;

$Li_2O$ content ranges from 5 to 20 percent;

$La_2O_3$ content ranges from 0.5 to 22 percent;

a ratio of ZnO content to RO that is the total content of MgO, CaO, SrO and BaO (ZnO/RO) is equal to or greater than 0.5;

a total content of $Gd_2O_3$, $Y_2O_3$ and $Yb_2O_3$ ranges from 1 to 15 percent;

$Sb_2O_3$ content ranges from 0 to 1 percent; and no BaO is comprised, or a ratio of the total content of $La_2O_3$, $Gd_2O_3$, $Y_2O_3$ and $Yb_2O_3$ to the content of BaO (($La_2O_3+Gd_2O_3+Y_2O_3+Yb_2O_3$)/BaO) is greater than 10.

As set forth above, glass the viscosity of which changes abruptly with temperature has a narrow temperature range suited to precision press molding, sometimes ending up cracking of the molded glass in a pressing mold. The cracking of molded articles in the pressing mold occurs during the glass cooling step. The coefficient of thermal expansion of the material used in the pressing mold is lower than that of the glass. When the press molded article is cooled along with the pressing mold with the mold closed, the differential between the coefficient of thermal expansion of the mold and that of the glass exerts stress on the press molded article. It is thought that in this process, the stress can be alleviated either by the press molded article matching the contraction of the pressing mold, or, if the structure of the glass is strong, by the molded surface of the press molded article separating from the molding surface of the pressing mold when the pressing mold contracts, resulting in the press molded article not cracking.

To achieve a high refractive index and low dispersion properties, it is desirable to employ $B_2O_3$ and $SiO_2$ as constituent components of the glass network. $B_2O_3$—$SiO_2$ glass tends to crack during press molding, as set forth above. The present inventors surmised that $B_2O_3$—$SiO_2$ glass cracked because it did not correspond to either of the aforementioned two models of stress alleviation in press molded articles during cooling and contraction of the pressing mold. Accordingly, based upon the discovery that the method of strengthening the structure of the glass was the more suitable strategy of the above two models in $B_2O_3$—$SiO_2$ glass, the present inventors found that the cracking problem could be diminished or prevented by changing the conventional composition to increase the content of $SiO_2$ greater than the content of $B_2O_3$. Accordingly, in the present invention, the ratio of $SiO_2$ content to $B_2O_3$ content is set at greater than 0.5 and equal to or less than 0.90.

However, not only is it necessary to solve the above-described problem of cracking in optical glass, but it is also necessary to achieve low-temperature softening property which is required to apply the glass to precision press molding while imparting prescribed optical characteristics, high-temperature stability and appropriate glass viscosity to permit the direct molding of high-quality preforms from glass melt with high productivity, and good weatherability. In the present invention, in order to simultaneously satisfy these requirements, $La_2O_3$ having functions of increasing the chemical durability of the glass and imparting a high refractive index is incorporated as an essential component, $Gd_2O_3$, $Y_2O_3$, and $Yb_2O_3$ having the same functions as $La_2O_3$ are incorporated as optional components, and an oxide of at least one from among the oxides of $Gd_2O_3$, $Y_2O_3$, and $Yb_2O_3$ are employed together with $La_2O_3$, resulting in heightening the high-temperature stability of the glass. Incorporating $Li_2O$ as an essential component both increases the refractive index of the glass and imparts a low-temperature softening property. $Li_2O$ is more effective than other alkali metal oxides, making it possible to achieve a desired refractive index and low-temperature softening property without having to incorporate an excessive quantity compromising resistance to devitrification and chemical durability properties. Further, in the present invention, ZnO is incorporated as an essential component both for increasing the refractive index of the glass and imparting a low-temperature softening property. To adjust optical constants, alkaline earth metal oxides in the form of MgO, CaO, SrO, and BaO are incorporated. ZnO is a component that effectively maintains good weatherability. However, since weatherability decreases when an excessive quantity of alkaline earth metal oxide is incorporated, the ratio of ZnO content to the total content of MgO, CaO, SrO and BaO (ZnO/MgO+CaO+SrO+BaO) is set to within a prescribed range. This makes it possible to achieve glass of good weatherability.

Although BaO functions to raise the refractive index, it also greatly reduces weatherability. Accordingly, in the present invention, rare earth oxides in the form of $La_2O_3$, $Gd_2O_3$, $Y_2O_3$ and $Yb_2O_3$ are actively incorporated as components that raise the refractive index and BaO is either not incorporated or is incorporated in a quantity limited in relation to the quantity of rare earth oxides.

The optical glass composition of the present invention, simultaneously satisfying the above characteristics, was devised by further adding $Sb_2O_3$ as an optical clarifying agent to such a composition.

Glass Composition

The reasons for setting the composition of the optical glass of the present invention to the above ranges will be described below. Unless specifically stated otherwise, the contents and total contents given below are expressed as molar percentages, and ratios of contents and total contents are expressed as molar basis.

$SiO_2$ is an essential component functioning to form the glass network. $SiO_2$ also has the effect of strengthening the network structure of the glass and mitigating change in viscosity relative to change in temperature. Thus, it works to reduce or prevent cracking of the glass during precision press molding, enhances chemical durability, and increases the outflow viscosity of the glass melt during forming of preforms, thereby facilitating forming of high-quality preforms. Accordingly, the above effects are not achieved when the $SiO_2$ content is excessively low. However, when an excessively large quantity of $SiO_2$ is incorporated, the glass transition temperature rises, which is unsuited to precision press molding, and the refractive index drops, making it difficult to achieve desired optical constants.

$B_2O_3$ is an essential component functioning to form the glass network, impart a low dispersion property to the glass, and decrease the glass transition temperature. When the quantity of $B_2O_3$ added is excessively low, the above effects are not achieved and the stability of the glass decreases, compromising the moldability of preforms and making it difficult to achieve desired optical constants. When the $B_2O_3$ content is excessively high, the chemical durability of the glass decreases and it becomes difficult to achieve desired optical constants. Further, when the quantity of $B_2O_3$ added is excessively high, it becomes impossible to incorporate the desired quantity of $SiO_2$, precluding the above-described effects obtained by the introduction of $SiO_2$.

The above-described effects can be achieved by setting the total content ($SiO_2+B_2O_3$) of the two components $SiO_2$ and $B_2O_3$, both of which are network-forming components, to 50 to 70 percent, preferably 50 to 65 percent.

To strengthen the structure of the glass, lessen the change in viscosity relative to temperature, eliminate the problem of the glass cracking, maintain low-temperature softening property, increase the suitability of the outflow viscosity of the glass melt to forming of preforms, and achieve good chemical durability, the ratio of $SiO_2$ content to $B_2O_3$ content ($SiO_2/B_2O_3$) is set to greater than 0.5 and equal to or less than 0.90, preferably greater than 0.5 and equal to or less than 0.85, more preferably greater than 0.5 and less than 0.8, further preferably 0.55 to 0.75, and still more preferably 0.55 to 0.7.

The $SiO_2$ content is determined by the total quantity in combination with the $B_2O_3$ content and the ratio to the $B_2O_3$ content. For the above-stated reasons, the $SiO_2$ content is preferably set to 15 to 30 percent, more preferably 18 to 30 percent, further preferably 18 to 27 percent, and still more preferably, 19 to 25 percent. For the above-stated reasons, the $B_2O_2$ content is preferably set to 25 to 45 percent, more preferably 30 to 40 percent, and further preferably, 32 to 37 percent.

$Li_2O$ is a component that increases the refractive index more and reduces the glass transition temperature more than other alkali metal oxide components, without the deterioration of chemical durability. It also improves the melting properties of the glass. It is difficult to achieve these effects when only a small quantity is incorporated. By contrast, when an excessively large quantity is introduced, the resistance to devitrification of the glass decreases, it becomes difficult to directly form high-quality preforms from outflowing glass melt, and weatherability decreases. Accordingly, in the optical glass of the present invention, the $Li_2O$ content is set to 5 to 20 percent, preferably 6 to 18 percent, more preferably 9 to 18 percent. $Na_2O$ and $K_2O$ may be incorporated in addition to $Li_2O$ as alkali metal oxides. Considering the above effects of $Li_2O$, the ratio of the $Li_2O$ content to $R'_2O$ that is the total content of $Li_2O$, $Na_2O$ and $K_2O$ ($Li_2O/R'_2O$) is preferably 0.8 to 1, more preferably 1.

To maintain both the stability and the chemical durability of the glass, the ratio of the total of the $SiO_2$ content and the $B_2O_3$ content to $R'_2O$ ($R'_2O/(SiO_2+B_2O_3)$) is preferably less than 0.3, more preferably less than 0.29.

$La_2O_3$ is an essential component that increases the refractive index and enhances chemical durability and weatherability without decreasing the stability of the glass or increasing dispersion. When introduced in an excessively low quantity, these effects are not achieved. When introduced in an excessively large quantity, the stability of the glass decreases, the glass transition temperature rises, it becomes difficult to form high-quality preforms and conduct precision press molding, and dispersion increases. Accordingly, in the optical glass of the present invention, the $La_2O_3$ content is 0.5 to 22 percent, preferably 1 to 15 percent, more preferably 2 to 10 percent, and further preferably, 3 to 10 percent.

$Gd_2O_3$ is an optional component which, in a manner similar to that of $La_2O_3$, increases the refractive index and enhances chemical durability and weatherability without compromising the stability or low dispersion characteristics of the glass. Particularly in combination with $La_2O_3$, it functions to further raise the stability of the glass against devitrification. However, when incorporated in excessively large quantity, it reduces the stability of the glass and increases the glass transition temperature, thereby compromising preform forming and precision press molding.

$Y_2O_3$ is an optional component which, in a manner similar to that of $Gd_2O_3$, increases the refractive index and enhances chemical durability and weatherability without compromising the stability or low dispersion characteristics of the glass. Particularly in combination with $La_2O_3$, it functions to further raise the stability of the glass against devitrification. However, when incorporated in excessively large quantity, it reduces the stability of the glass and increases the glass transition temperature, thereby compromising preform forming and precision press molding.

$Yb_2O_3$ is an optional component which, in a manner similar to that of $Gd_2O_3$ and $Y_2O_3$, increases the refractive index and enhances chemical durability and weatherability without compromising the stability or low dispersion characteristics of the glass. Particularly in combination with $La_2O_3$, it functions to further raise the stability of the glass against devitrification. However, when incorporated in an excessively large quantity, it reduces the stability of the glass and increases the glass transition temperature, thereby compromising preform forming and precision press molding.

Since $Gd_2O_3$, $Y_2O_3$ and $Yb_2O_3$ are effective optional components when employed with $La_2O_3$ in increasing the stability of the glass against devitrification and permitting the direct forming of high-quality preforms from glass melt, the total content of $Gd_2O_3$, $Y_2O_3$ and $Yb_2O_3$ is set to equal to or greater than 1 percent in the optical glass of the present invention. However, when this combined content is excessively high, the stability of the glass decreases and the glass transition temperature rises. Thus, an upper limit of 15 percent is set for the total content of $Gd_2O_3$, $Y_2O_3$ and $Yb_2O_3$. The preferable range of the total content of $Gd_2O_3$, $Y_2O_3$ and $Yb_2O_3$ is 1 to 10 percent, and the more preferable range is 1 to 6 percent. Among $Gd_2O_3$, $Y_2O_3$, and $Yb_2O_3$, $Gd_2O_3$ and $Y_2O_3$ are advantageous for achieving the above effects. Thus, the total content of $Gd_2O_3$ and $Y_2O_3$ is preferably 1 to 10 percent, more preferably 1 to 6 percent. The ratio of the total content of $Gd_2O_3$, $Y_2O_3$, and $Yb_2O_3$ to $La_2O_3$ (($Gd_2O_3+Y_2O_3+Yb_2O_3$)/$La_2O_3$) is preferably set to 0.3 to 1.5 to increase the stability of the glass.

The preferred range of the $Gd_2O_3$ content is 0 to 8 percent, more preferably 0 to 6 percent.

The preferred range of the $Y_2O_3$ content is 0 to 5 percent, more preferably 0.1 to 3 percent, and still more preferably, 0.1 to 2.5 percent.

The preferred range of the $Yb_2O_3$ content is 0 to 5 percent, more preferably 0 to 3 percent, with no introduction at all being particularly preferred.

ZnO is an essential component for reducing the melting temperature, liquid phase temperature, and glass transition temperature of the glass; enhancing the chemical durability and weatherability of the glass; and raising the refractive index. ZnO increases the weatherability of the glass much more than other bivalent components. By contrast, BaO is a component that raises the refractive index but compromises the weatherability of the glass; thus, the desired amount of ZnO should be introduced in place of BaO. To adequately achieve the effects obtained by introducing ZnO set forth above, the content of ZnO is preferably 5 to 20 percent, more preferably 6 to 20 percent, and further preferably, 7 to 20 percent.

MgO, CaO, SrO and BaO play roles in adjusting optical constants and the like. In particular, when CaO is employed with $SiO_2$ and $B_2O_3$, it has the effect of reducing the glass transition temperature. Accordingly, 1 percent or more of CaO is preferably introduced, with a CaO content of 1 to 14 percent being further preferred. Additionally, when the formulation of bivalent components including ZnO into the alkaline earth metal oxides is not suitable, it becomes difficult to achieve a glass having good weatherability. Thus, the ratio of ZnO to RO that is the total content of MgO, CaO, SrO and BaO (ZnO/RO) is equal to or less than 0.5. The preferred range of ZnO/RO is 0.5 to 4, more preferably 0.6 to 3.

RO that is the total content of MgO, CaO, SrO and BaO is preferably 1 to 14 percent, more preferably 2 to 14 percent from the perspective of adjusting optical constants and achieving a low glass transition temperature.

It is desirable to consider the formulation of MgO, CaO, SrO and BaO to lower the glass transition temperature and achieve good weatherability. As set forth above, the introduction of a suitable quantity of CaO lowers the glass transition temperature. The introduction of BaO negatively affects weatherability. Thus, the ratio of CaO to RO (CaO/RO) is preferably 0.5 to 1, more preferably 0.8 to 1. The ratio of the BaO content to RO (BaO/RO) is preferably 0 to 0.2, with 0 being particularly preferred.

As stated above, BaO serves to raise the refractive index, but also reduces glass weatherability, that is, reduces chemical durability. In the present invention, when BaO is not incorporated at all, the ratio of the content of BaO to the total contents of other refractive index-increasing components in the form of $La_2O_3$, $Gd_2O_3$, $Y_2O_3$ and $Yb_2O_3$ is controlled to achieve the desired refractive index. That is, in the optical glass of the present invention, BaO is either not incorporated or, when incorporated, the content of BaO is set so that the ratio of the total content of $La_2O_3$, $Gd_2O_3$, $Y_2O_3$ and $Yb_2O_3$ to the BaO content $((La_2O_3+Gd_2O_3+Y_2O_3+Yb_2O_3)/BaO)$ is equal to or greater than 10. This makes it possible to achieve an optical glass having both desired optical characteristics and good chemical durability. When BaO is incorporated, $((La_2O_3+Gd_2O_3+Y_2O_3+Yb_2O_3)/BaO)$ is preferably equal to or greater than 11, more preferably equal to or greater than 12, further preferably equal to or greater than 15 or more, and still more preferably, equal to or greater than 18.

$Sb_2O_3$ is an optional additive employed as a clarifying agent. Since an adequate effect can be achieved at equal to or less than 1 percent, the content is set to 0 to 1 percent, preferably 0 to 0.06 percent, in the optical glass of the present invention. When $Sb_2O_3$ is added in an excessively large quantity, the molding surface of the pressing mold oxidizes during precision press molding, negatively affecting the service life of the pressing mold; such addition is thus undesirable from the viewpoint of precision press molding.

$Al_2O_3$ is an optional component incorporated to enhance the durability and weatherability of the glass. When the content exceeds 5 percent, the glass transition temperature may rise sharply and optical constants may fall outside the desired ranges. Thus, in the optical glass of the present invention, the content of $Al_2O_3$ is preferably 0 to 5 percent, more preferably 0 to 3 percent, and further preferably, 0 to 2 percent.

$ZrO_2$ is an optional component incorporated to enhance glass weatherability and adjust optical constants. When the content thereof exceeds 5 percent, optical constants tend to fall outside the desired ranges and the low-temperature softening property deteriorates. Accordingly, in the optical glass of the present invention, the content of $ZrO_2$ is preferably 0 to 5 percent, further preferably 0.1 to 4 percent.

To achieve the object of the present invention, the composition of the optical glass of the present invention is basically comprised of essential components and optional components as mentioned above. In the optical glass of the present invention, the total content of $SiO_2$, $B_2O_3$, $Li_2O$, $Na_2O$, $K_2O$, MgO, CaO, SrO, ZnO, $La_2O_3$, $Gd_2O_3$, $Y_2O_3$, $Yb_2O_3$, $Al_2O_3$, $ZrO_2$ and $Sb_2O_3$ preferably exceeds 94 percent, more preferably exceeds 96 percent, further preferably exceeds 98 percent, still more preferably exceeds 99 percent, and yet even more preferably, is 100 percent.

Of these, the total content of $SiO_2$, $B_2O_3$, $Li_2O$, CaO, ZnO, $La_2O_3$, $Gd_2O_3$, $Y_2O_3$, $Al_2O_3$, $ZrO_2$ and $Sb_2O_3$ preferably exceeds 94 percent, more preferably exceeds 96 percent, further preferably exceeds 98 percent, still more preferably exceeds 99 percent, and yet even more preferably, is 100 percent.

$Ta_2O_5$, $WO_3$, $Nb_2O_5$, $TiO_2$, $P_2O_5$ and F may be incorporated to the extent that the object of the present invention is not compromised. However, taking into account starting material costs, effects on various characteristics of the glass, and productivity, these components should be sparingly employed. The total content of $Ta_2O_5$, $WO_3$, $Nb_2O_5$, $TiO_2$, $P_2O_5$ and F is preferably less than 2 percent, more preferably less than 1 percent, further preferably less than 0.5 percent, and still more preferably, zero. Of these, F is a component that does not readily yield high-quality preforms when directly forming preforms from glass melt and is desirably not incorporated.

So as not to negatively impact the environment, the incorporation of Pb, Cr, Cd, As, The and Te is to be avoided. Conventionally, Pb has been employed as a principal component of optical glass to raise the refractive index. However, in addition to the environmental issue, it is readily reduced in precision press molding in a nonoxidizing gas atmosphere. There are problems in that precipitating metallic lead adheres to the molding surface of the pressing mold and lowers the surface precision of press molded articles. $As_2O_3$ has conventionally been added as a clarifying agent. However, in addition to the environmental issue, it causes problems by oxidizing the molding surfaces of the pressing mold, shortening the service life of the mold, and should thus be avoided.

Glass Characteristics

The characteristics of the optical glass of the present invention will be described below. In the present invention, the following desired characteristics can be achieved by suitably determining the glass composition, particularly by incorporating the various components within the above-stated ranges.

The optical glass of the present invention has optical characteristics in the form of a refractive index (nd) of equal to or greater than 1.65 and an Abbé number (vd) ranging from 50 to 60, preferably optical characteristics in the form of a refractive index (nd) of equal to or greater than 1.66 and an Abbé number (vd) falling within a range of 51.0 to 57.0.

The optical glass of the present invention has a low-temperature softening property suited to precision press molding, and in a preferred form, has a glass transition temperature (Tg) of equal to or less than 560° C., more preferably equal to or less than 550° C., and further preferably, equal to or less than 540° C.

In the above-mentioned preferred form, the yield point (Ts) is equal to or less than 610° C., more preferably equal to or less than 600° C., and further preferably equal to or less than 590° C.

When the glass transition temperature and yield point of the optical glass are low, it is possible to reduce the heating temperature of the glass during press molding. As a result, the time required to heat and cool the glass can be shortened, permitting increased throughput in press molded article manufacturing. Further, since the heating temperature of the pressing mold can be lowered, the service life of the pressing mold can be extended.

The optical glass of the present invention is stable at elevated temperatures, has the above-described optical properties and low-temperature softening property, and has a viscosity at elevated temperature that is suited to molding. Thus, it permits the forming directly from glass melt of precision press molding preforms in a glass cooling step.

Method for Manufacturing Optical Glass

The optical glass of the present invention can be manufactured by heating and melting glass starting materials. Carbonates, nitrates, oxides, and the like may be suitably employed as glass starting materials. These starting materials are weighed out in a desired ratio and mixed to form a blended starting material. This blended starting material is heated to, for example, 1,200 to 1,300° C. in a melting furnace, melted, clarified, stirred, and homogenized to obtain a uniform glass melt free of bubbles and undissolved matter. This glass melt can be molded and gradually cooled to obtain the optical glass of the present invention.

[Precision Press Molding Preform and Method for Manufacturing a Precision Press Molding Preform]

The precision press molding preform and the method of manufacturing the same of the present invention will be described below.

A precision press molding preform can also be referred to as a preform for precision press molding, and is referred to hereinafter as the "preform".

A preform is a molded glass article of equal weight to a precision press molded article. The preform is formed to a shape suited to the shape of the precision press molded article. Examples of such shapes are spherical and spheroidal shapes. The preform is heated to impart a viscosity permitting precision press molding and supplied to precision press molding.

The preform of the present invention is comprised of the above-described optical glass of the present invention. A thin film such as a mold separation film may be formed on the surface of the preform of the present invention. The preform lends itself to precision press molding of optical elements of desired optical constants. Further, since the glass is stable in the elevated temperature range and since the viscosity of the glass melt during outflow can be heightened, there is an advantage in that high-quality preforms can be manufactured with high productivity by a method comprising separating a glass melt gob from glass melt flowing out from a pipe and, during cooling of said glass melt gob, forming said glass melt gob into a preform.

The method for manufacturing a preform of the present invention is a method comprising separating a glass melt gob from glass melt flowing out from a pipe and, during cooling of said glass melt gob, forming said glass melt gob into a precision press molding preform comprised of the optical glass of the present invention. This is one method of manufacturing the preform of the present invention. A specific example is a method in which a glass melt gob of prescribed weight is separated from an outflowing glass melt flow and a preform having prescribed weight and comprised of the optical glass of the present invention is formed during cooling of the glass gob.

The above method is advantageous in that mechanical processing such as cutting, grinding, and polishing is unnecessary. Mechanically processed preforms require annealing prior to mechanical processing to reduce glass distortion to a degree at which damage does not occur. However, in the above-described method of manufacturing preforms, damage-preventing annealing is unnecessary. It is also possible to form preforms with smooth surfaces.

In the above-described method of manufacturing preforms, from the perspective of imparting smooth and clean surfaces, the preform is desirably formed in a floating state achieved by wind pressure. Further, preforms comprising free surfaces are desirable. Still further, preforms free of cutting marks known as shear marks are also desirable. Shear marks are produced when an outflowing glass melt is cut with a cutting blade. When shear marks remain at the stage where the preform has been molded into a precision press molded article, that portion is defective. Thus, shear marks are desirably eliminated at the preform stage. Methods of glass melt separation that do not produce shear marks and do not employ cutting blades include the method of dripping the glass melt from the outflow pipe, and the method of supporting the front portion of a glass melt flow flowing out from an outflow pipe and removing the support at a timing permitting the separation of a glass melt gob of prescribed weight (the drop-cut method). In the drop-cut method, the glass is separated at a constricted portion produced between the front end side of the glass melt flow and the outflow pipe side, making it possible to obtain a glass melt gob of prescribed weight. Next, while the glass melt gob that has been obtained is in a softened state, it is molded to a suitable shape for feeding in press molding.

In the above-described method of manufacturing preforms, a glass melt gob corresponding to a single preform is separated and the preform is formed while the glass gob is at a high temperature at or above the softening point of the glass. However, it is also possible to cause the glass melt to flow into a casting mold, mold a molded glass article comprised of the above-described optical glass, and mechanically process the molded glass article to obtain a preform of desired weight. The glass is desirably annealed prior to mechanical processing to adequately eliminate distortion so that the glass will not be damaged.

[Optical Element and Method for Manufacturing an Optical Element]

The optical element of the present invention is characterized by being comprised of the above-described optical glass of the present invention. The optical element of the present invention is also characterized, in the same manner as the optical glass of the present invention constituting the optical element, by having a high refractive index and low dispersion.

Examples of the optical element of the present invention are various types of lenses such as spherical lenses, aspherical lenses, and microlenses; diffraction gratings, lenses with diffraction gratings, lens arrays, and prisms. This optical element is desirably obtainable by heating and softening the preform of the present invention, followed by precision press molding.

As needed, optical thin films such as antireflective films, fully reflective films, partially reflective films, and films having spectroscopic characteristics can be provided on the optical element.

The method for manufacturing an optical element will be described below.

The method for manufacturing an optical element of the present invention is a method comprising heating the preform of the present invention or a preform manufactured by the method for manufacturing a preform of the present invention and precision press molding said heated preform with a pressing mold.

Precision press molding is also called mold optics molding, and is already well known in the field of art to which the present invention belongs.

A surface that transmits, refracts, diffracts, or reflects a light ray of an optical element is known as an optically functional surface. Taking the example of a lens, the aspherical surface of an aspherical lens and the spherical surface of a spherical lens correspond to optically functional surfaces. In precision press molding, the molding surface of the press mold is precisely transferred to the glass to mold an optically functional surface by press molding. That is, there is no need to conduct mechanical processing such as grinding or polishing to finish the optically functional surface.

Accordingly, the method for manufacturing an optical element of the present invention is suited to the manufacturing of optical elements such as lenses, lens arrays, diffraction gratings, and prisms, and is optimal for the manufacturing of aspherical lenses with high production efficiency.

Based on the method for manufacturing an optical element of the present invention, it is possible to manufacture optical elements having the above-described optical characteristics. Further, since preforms comprised of optical glass having a low-temperature softening property are employed, pressing can be conducted at a relatively low temperature in the press molding of the glass, thereby reducing the load on the molding surfaces of the pressing mold, extending the service life of the pressing mold (or the mold separation films when such is provided on molding surfaces). Since the glass constituting the preform is highly stable, devitrification of the glass can be effectively prevented even during the reheating and pressing steps. Further, a series of high productivity steps can be conducted from melting the glass to obtaining the final product.

A known pressing mold may be employed, such as a pressing mold comprised of a mold material such as silicon carbide, an ultrahard material, or stainless steel with molding surfaces coated with a mold separation film. A mold separation film in the form of a carbon-containing film, precious metal alloy film, or the like may be employed. The pressing mold comprises upper and lower molds and a sleeve mold if necessary. To effectively reduce or prevent damage to glass molded articles during press molding, pressing molds comprised of silicon carbide and pressing molds made of ultrahard alloys (particularly ultrahard alloys not containing binder, such as pressing molds made of WC) are preferably employed, and pressing molds equipped with mold separation films in the form of carbon-containing films on the molding surfaces of the above-mentioned molds are more preferably employed.

In precision press molding, a non-oxidizing gas atmosphere is desirably employed during molding to keep the molding surface of the pressing mold in good condition. Nitrogen and mixed gases of nitrogen and hydrogen are desirable as the non-oxidizing gas. In particular, when employing a pressing mold the molding surface of which is provided with a mold release film in the form of a carbon-containing film, and when employing a pressing mold made of silicon carbide, precision press molding should be conducted in the above-described non-oxidizing atmosphere.

Precision press molding methods particularly suited to the method of manufacturing optical elements of the present invention will be described below.

(Precision Press Molding Method 1)

In this method (referred to as precision press molding method 1), a preform is introduced into a press mold, the press mold and preform are heated together, and then precision press molding is conducted.

In precision press molding method 1, both the press mold and preform are desirably heated to a temperature at which the glass constituting the preform exhibits a viscosity of $10^6$ to $10^{12}$ dPa·s and precision press molding is conducted.

After cooling the glass to a temperature at which it exhibits a viscosity of equal to or greater than $10^{12}$ dPa·s, preferably equal to or greater than $10^{14}$ dPa·s, and more preferably equal to or greater than $10^{16}$ dPa·s, the precision press molded article is desirably removed from the press mold.

Based on the above conditions, it is both possible to more precisely transfer the shape of the molding surface of the press mold to the glass and to remove the precision press molded article without deformation.

(Precision Press Molding Method 2)

This method is characterized in that a preform that has been preheated separately from a pressing mold is introduced into a preheated pressing mold and then precision press molded (referred to hereinafter as "precision press molding method 2").

According to this method, since the preform is preheated before being introduced into the pressing mold, the cycle time can be shortened and optical elements with good surface precision and no surface defects can be manufactured.

The pressing mold is desirably preheated to a temperature lower than that to which the preform is preheated. Such preheating makes it possible to keep the preheating temperature of the pressing mold low, reducing wear and tear on the pressing mold.

In precision press molding method 2, preheating of the preform is preferably conducted to a temperature at which the glass constituting the preform exhibits a viscosity of equal to or less than $10^9$ dPa·s, more preferably $10^9$ dPa·s.

Further, preheating is preferably conducted while floating the above-described preform, it being desirable for preheating to be conducted to a temperature at which the glass constituting the preform exhibits a viscosity of $10^{5.5}$ to $10^9$ dPa·s, more preferably equal to or greater than $10^{5.5}$ and less than $10^9$ dPa·s.

Cooling of the glass is desirably begun either simultaneously with the start of pressing or during pressing.

The temperature of the pressing mold is preferably adjusted to be lower than the temperature to which the preform is preheated; a temperature at which the glass exhibits a viscosity of $10^9$ to $10^{12}$ dPa·s can be used as a yardstick.

In this method, following press molding, removal from the mold is desirably conducted after cooling to a temperature at which the glass exhibits a viscosity of equal to or greater than $10^{12}$ dPa·s.

The precision press molded optical element is removed from the press mold and gradually cooled as needed. When the molded article is an optical element such as a lens, the surface thereof can be coated with an optical thin film as needed.

EXAMPLES

The present invention will be described in detail below based on examples. However, the present invention is not limited to the examples.

Manufacturing Optical Glass

Table 1 shows the glass composition of Examples 1 to 19 and Comparative Examples 1 and 2 ($SiO_2/B_2O_3<0.5$). In all of these glasses, various oxides, hydroxides, carbonates, and nitrates corresponding to the various components were employed as starting materials. For each of the glasses, these starting materials were weighed out in such a manner as to yield the composition denoted in Table 1 after vitrification, intimately mixed, charged to a platinum crucible, melted at a temperature ranging from 1,200 to 1,300° C. in an electric furnace, homogenized by stirring, and clarified. They were then cast into a metal mold that had been preheated to a suitable temperature. The cast glass was cooled to the transition temperature, immediately charged to an annealing furnace, and gradually cooled to room temperature. In this manner, various optical glasses were obtained.

The refractive index (nd), Abbé number (vd), specific gravity, glass transition temperature, and yield point were measured for the various optical glasses obtained by the above-described method by the following methods. The results are given in Table 2.

(1) Refractive index (nd) and Abbé number (vd):
   Measured for optical glass obtained by gradually reducing the temperature at a rate of 30° C./hour.
(2) Glass transition temperature and yield point
   Measured for a heating rate of 4° C./minute with a thermo-mechanical analyzer from Rigaku Denki K.K.
(3) Specific gravity
   Calculated by Archimedes' method.

TABLE 2

| Examples | Refractive index (nd) | Abbé number (vd) | Specific gravity | Glass transition temp. (° C.) | Yield point (° C.) |
|---|---|---|---|---|---|
| 1 | 1.69984 | 53.02 | 3.81 | 546.6 | 590.5 |
| 2 | 1.70151 | 52.71 | 3.81 | 533.4 | 577.3 |
| 3 | 1.69261 | 53.20 | 3.70 | 536.6 | 581.4 |
| 4 | 1.69344 | 53.18 | 3.73 | 532.4 | 576.3 |
| 5 | 1.69574 | 53.07 | 3.69 | 525.8 | 569.2 |
| 6 | 1.69377 | 53.33 | 3.75 | 540.1 | 583.4 |
| 7 | 1.69395 | 53.22 | 3.75 | 524.9 | 568.4 |
| 8 | 1.69207 | 53.20 | 3.72 | 525.1 | 568.2 |
| 9 | 1.69259 | 53.24 | 3.82 | 519.2 | 564.2 |
| 10 | 1.68635 | 53.66 | 3.77 | 525.4 | 570.6 |
| 11 | 1.68831 | 53.27 | 3.518 | 526 | — |
| 12 | 1.67278 | 55.33 | 3.546 | 523 | — |
| 13 | 1.67198 | 55.54 | 3.502 | 530 | — |
| 14 | 1.67321 | 55.23 | 3.542 | 534 | — |
| 15 | 1.67069 | 55.57 | 3.525 | 537 | — |
| 16 | 1.67410 | 55.48 | 3.504 | 532 | — |
| 17 | 1.67069 | 55.57 | 3.492 | 533 | — |
| 18 | 1.67405 | 55.48 | 3.541 | 538 | — |
| 19 | 1.66894 | 55.47 | 3.467 | 528 | 574 |

| Comp. Ex. | nd | vd |
|---|---|---|
| 1 | 1.6935 | 53.2 |
| 2 | 1.69822 | 55.5 |

Manufacturing a Precision Press Molding Preform

Clarified and homogenized glass melts corresponding to Examples 1 to 19 and Comparative Examples 1 and 2 were caused to flow at a constant rate out of a platinum-alloy pipe the temperature of which had been adjusted to within a range permitting stable outflow without devitrification of the glass. Dripping or the drop-cut method was employed to separate a

TABLE 1

(Unit: mol %)

| Examples | $B_2O_3$ | $SiO_2$ | $B_2O_3 + SiO_2$ | $SiO_2/B_2O_3$ | $Al_2O_3$ | $La_2O_3$ | $Gd_2O_3$ | $Y_2O_3$ | $Gd_2O_3 + Y_2O_3$ | $ZrO_2$ | CaO | RO | ZnO | ZnO/RO | $Li_2O$ | Total |
|---|---|---|---|---|---|---|---|---|---|---|---|---|---|---|---|---|
| 1 | 35.50 | 21.00 | 56.50 | 0.5915 | 1.00 | 6.00 | 4.00 | 1.50 | 5.50 | 2.50 | 5.00 | 5.00 | 13.00 | 2.600 | 10.50 | 100 |
| 2 | 34.00 | 21.00 | 55.00 | 0.6176 | 1.00 | 6.00 | 4.00 | 1.50 | 5.50 | 2.50 | 5.00 | 5.00 | 13.00 | 2.600 | 12.00 | 100 |
| 3 | 35.50 | 21.00 | 56.50 | 0.5915 | 1.00 | 6.00 | 3.00 | 1.50 | 4.50 | 2.50 | 5.00 | 5.00 | 13.00 | 2.600 | 11.50 | 100 |
| 4 | 35.50 | 21.00 | 56.50 | 0.5915 | 1.00 | 6.50 | 3.00 | 1.50 | 4.50 | 2.00 | 3.50 | 3.50 | 13.00 | 3.714 | 13.00 | 100 |
| 5 | 35.50 | 21.00 | 56.50 | 0.5915 | 1.00 | 8.00 | 1.50 | 1.50 | 3.00 | 2.00 | 3.50 | 3.50 | 12.00 | 3.429 | 14.00 | 100 |
| 6 | 35.50 | 21.00 | 56.50 | 0.5915 | 1.00 | 5.20 | 4.00 | 1.50 | 5.50 | 2.50 | 5.00 | 5.00 | 13.00 | 2.600 | 11.30 | 100 |
| 7 | 34.00 | 21.00 | 55.00 | 0.6176 | 1.00 | 6.00 | 3.50 | 1.50 | 5.00 | 1.50 | 5.00 | 5.00 | 13.00 | 2.600 | 13.50 | 100 |
| 8 | 34.00 | 21.00 | 55.00 | 0.6176 | 1.00 | 5.50 | 3.50 | 1.50 | 5.00 | 2.00 | 5.00 | 5.00 | 13.00 | 2.600 | 13.50 | 100 |
| 9 | 31.00 | 24.00 | 55.00 | 0.7742 | 1.00 | 6.00 | 4.50 | 0.00 | 4.50 | 1.50 | 5.00 | 5.00 | 9.50 | 1.900 | 14.50 | 100 |
| 10 | 31.00 | 24.00 | 55.00 | 0.7742 | 1.00 | 5.50 | 4.00 | 0.00 | 4.00 | 1.50 | 5.00 | 5.00 | 7.50 | 1.500 | 15.00 | 100 |
| 11 | 34.00 | 21.00 | 55.00 | 0.6176 | 1.00 | 4.00 | 4.00 | 1.50 | 5.50 | 2.50 | 7.00 | 7.00 | 13.00 | 1.860 | 12.00 | 100 |
| 12 | 37.00 | 21.00 | 58.00 | 0.5676 | 1.00 | 4.00 | 4.00 | 1.00 | 5.00 | 1.00 | 9.00 | 9.00 | 9.00 | 1.000 | 13.00 | 100 |
| 13 | 36.50 | 21.00 | 57.50 | 0.5753 | 1.00 | 4.00 | 3.50 | 1.00 | 4.50 | 1.00 | 12.00 | 12.00 | 8.00 | 0.670 | 12.00 | 100 |
| 14 | 35.00 | 21.00 | 56.00 | 0.6000 | 1.00 | 4.00 | 3.50 | 1.00 | 4.50 | 1.00 | 12.00 | 12.00 | 8.00 | 0.670 | 13.50 | 100 |
| 15 | 36.50 | 21.00 | 57.50 | 0.5753 | 1.00 | 4.00 | 3.50 | 1.00 | 4.50 | 1.00 | 11.00 | 11.00 | 8.00 | 0.730 | 13.00 | 100 |
| 16 | 36.50 | 21.00 | 57.50 | 0.5753 | 1.00 | 4.50 | 4.00 | 0.00 | 4.00 | 1.00 | 12.00 | 12.00 | 8.00 | 0.670 | 12.00 | 100 |
| 17 | 36.50 | 21.00 | 57.50 | 0.5753 | 1.00 | 4.00 | 3.50 | 1.00 | 4.50 | 1.00 | 10.00 | 10.00 | 8.00 | 0.800 | 14.00 | 100 |
| 18 | 36.00 | 21.00 | 57.00 | 0.5833 | 1.00 | 4.00 | 3.30 | 1.00 | 4.30 | 1.00 | 11.00 | 11.00 | 8.00 | 0.730 | 13.70 | 100 |
| 19 | 35.50 | 21.00 | 56.50 | 0.5915 | 1.00 | 4.00 | 3.50 | 1.00 | 4.50 | 1.00 | 9.00 | 9.00 | 8.00 | 0.890 | 16.00 | 100 |

(Unit: mol %)

| Comp. Ex. | $B_2O_3$ | $SiO_2$ | $B_2O_3 + SiO_2$ | $SiO_2/B_2O_3$ | $Al_2O_3$ | $La_2O_3$ | $Gd_2O_3$ | $Y_2O_3$ | $Gd_2O_3 + Y_2O_3$ | $ZrO_2$ | CaO | RO | ZnO | ZnO/RO | $Li_2O$ | Total |
|---|---|---|---|---|---|---|---|---|---|---|---|---|---|---|---|---|
| 1 | 40.00 | 12.00 | 52.00 | 0.3000 | 6.50 | 0.00 | 3.00 | 3.00 | 3.00 | 2.50 | 14.00 | 14.00 | 11.00 | 0.786 | 11.00 | 100 |
| 2 | 50.00 | 13.00 | 63.00 | 0.2600 | 9.00 | 2.00 | 4.00 | 4.00 | 6.00 | 0.00 | 10.00 | 10.00 | 4.00 | 0.400 | 8.00 | 100 |

(Note)
RO = MgO + CaO + SrO + BaO glass melt gob with the weight of a preform to be formed. The glass melt gob was received by a receiving mold having gas blow holes in the bottom. The glass gob was formed into a precision press molding preform while blowing gas through the blow holes to float the glass gob. The separation timing of the glass melt was adjusted and set to obtain spherical preforms 2 to 30 mm in diameter.

Manufacturing an Optical Element (Aspherical Lens)

The preform obtained by the above-described method was precision press molded using the pressing device shown in FIG. 1 to obtain an aspherical lens. Specifically, the preform was placed between a lower mold 2 and an upper mold 1 constituting a pressing mold, the interior of a quartz tube 11 was backfilled with a nitrogen atmosphere, and a heater 12 was turned on to heat the interior of quartz tube 11. The temperature within the pressing mold was set to a temperature at which the glass being molded exhibited a viscosity of $10^8$ to $10^{10}$ dPa·s. While maintaining this temperature, pressing rod 13 was lowered, pressing upper mold 1 downward and pressing the preform that had been placed in the pressing mold. The pressing pressure of 8 MPa was applied for 30 seconds. Following pressing, the pressure was removed and the glass molded article that had been press molded was gradually cooled to a temperature at which the glass exhibited a viscosity of equal to or greater than $10^{12}$ dPa·s with lower mold 2 and upper mold 1 still in contact. The glass molded article was then rapidly cooled to room temperature and removed from the pressing mold, yielding an aspherical lens.

The glasses of Comparative Examples 1 and 2, which had low ratios of $SiO_2/B_2O_3$, were frequently damaged during precision press molding. However, in the glasses of Examples 1 to 19, almost no damage to the glass was observed during precision press molding.

As was clear from these results, all of the glasses of Examples 1 to 19 possessed the desired optical characteristics and had good moldability permitting molding in a pressing mold without damage to the glass during precision press molding.

The present invention provides a high refractive index, low dispersion optical glass suited to precision press molding. Precision press molding preforms can be manufactured with high productivity from the optical glass of the present invention. Further, the present invention provides optical elements comprised of high refractive index, low dispersion glass with high productivity.

What is claimed is:

1. Optical glass having a refractive index (nd) of equal to or greater than 1.65 and an Abbé number (vd) ranging from 50 to 60, wherein, as molar basis,
   a ratio of $SiO_2$ content to $B_2O_3$ content ($SiO_2/B_2O_3$) is greater than 0.5 and less than 0.8;
   a total content of $SiO_2$ and $B_2O_3$ ranges from 50 to 70 percent;
   $Li_2O$ content ranges from 5 to 20 percent;
   $La_2O_3$ content ranges from 0.5 to 22 percent;
   a ratio of ZnO content to RO that is the total content of MgO, CaO, SrO and BaO (ZnO/RO) is equal to or greater than 0.5;
   a total content of $Gd_2O_3$, $Y_2O_3$ and $Yb_2O_3$ ranges from 1 to 15 percent;
   $Sb_2O_3$ content ranges from 0 to 1 percent; and
   no BaO is comprised, or a ratio of the total content of $La_2O_3$, $Gd_2O_3$, $Y_2O_3$ and $Yb_2O_3$ to the content of BaO (($La_2O_3+Gd_2O_3+Y_2O_3+Yb_2O_3$)/BaO) is equal to or greater than 10.

2. The optical glass of claim 1, wherein RO that is the total content of MgO, CaO, SrO and BaO ranges from 1 to 14 percent and ZnO content ranges from 5 to 20 percent.

3. The optical glass of claim 1, wherein CaO content ranges from 1 to 14 percent.

4. The optical glass of claim 1, wherein a ratio of CaO content to RO that is the total content of MgO, CaO, SrO and BaO (CaO/RO) ranges from 0.5 to 1.

5. The optical glass of claim 1, which comprises 0 to 8 percent of $Gd_2O_3$, 0 to 5 percent of $Y_2O_3$, and 0 to 5 percent of $Yb_2O_3$.

6. The optical glass of claim 1, wherein a ratio of the total content of $Li_2O$, $Na_2O$ and $K_2O$ to the total content of $SiO_2$ and $B_2O_3$ (($Li_2O+Na_2O+K_2O$)/($SiO_2+B_2O_3$)) is less than 0.3.

7. The optical glass of claim 1, which comprises 0 to 5 percent of $Al_2O_3$ and 0 to 5 percent of $ZrO_2$.

8. A precision press molding preform, which is comprised of the optical glass of claim 1.

9. An optical element comprised of the optical glass of claim 1.

* * * * *